(12) United States Patent
Lu

(10) Patent No.: US 9,810,851 B2
(45) Date of Patent: Nov. 7, 2017

(54) MULTI-FIBER CONNECTOR FOR USE WITH RIBBON FIBER OPTIC CABLE

(71) Applicant: CommScope Technologies LLC, Hickory, NC (US)

(72) Inventor: Yu Lu, Eden Prairie, MN (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 0 days.

(21) Appl. No.: 15/274,447

(22) Filed: Sep. 23, 2016

(65) Prior Publication Data
US 2017/0090126 A1    Mar. 30, 2017

Related U.S. Application Data

(60) Provisional application No. 62/233,041, filed on Sep. 25, 2015.

(51) Int. Cl.
G02B 6/38    (2006.01)

(52) U.S. Cl.
CPC ......... *G02B 6/3821* (2013.01); *G02B 6/3869* (2013.01); *G02B 6/3885* (2013.01)

(58) Field of Classification Search
CPC .. G02B 6/3885; G02B 6/3887; G02B 6/3893; G02B 6/3821; G02B 6/3879; G02B 6/3869; G02B 6/381; G02B 6/4261
See application file for complete search history.

(56) References Cited

U.S. PATENT DOCUMENTS

| | | | |
|---|---|---|---|
| 5,214,730 A | 5/1993 | Nagasawa et al. |
| 6,085,003 A | 7/2000 | Knight |
| 7,537,393 B2 | 5/2009 | Anderson et al. |
| 7,742,667 B2 | 6/2010 | Paschal et al. |
| 7,758,257 B2 | 7/2010 | Anderson et al. |
| 8,684,611 B2 | 4/2014 | Childers et al. |
| 8,718,427 B2 | 5/2014 | Paschal et al. |
| 8,992,098 B2 | 3/2015 | Anderson et al. |
| 9,229,174 B2 | 1/2016 | Anderson et al. |

OTHER PUBLICATIONS

MPO Ribbon Fiber Kit for Hydra Cable Assembly, Apr. 2006, 3 pages.

*Primary Examiner* — Thomas A Hollweg
*Assistant Examiner* — Mary A El Shammaa
(74) *Attorney, Agent, or Firm* — Merchant & Gould P.C.

(57) ABSTRACT

Aspects of the present disclosure relate to a multi-fiber fiber optic connector having a connector body, a multi-fiber ferrule supported at a distal end of the connector body, a spring for biasing the multi-fiber ferrule in a distal direction and a spring push retaining the spring and the ferrule within the connector body. The spring push including oppositely positioned spring support shelves that provide spring seating and provide spring stability during side loading.

13 Claims, 15 Drawing Sheets

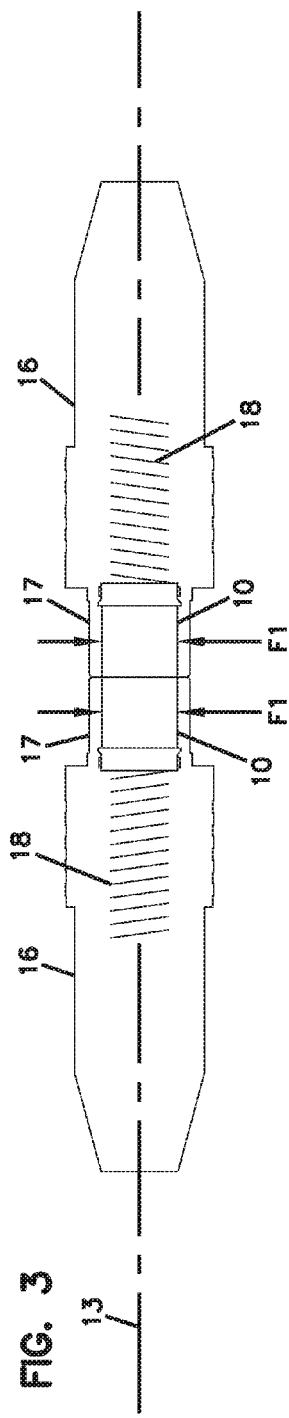
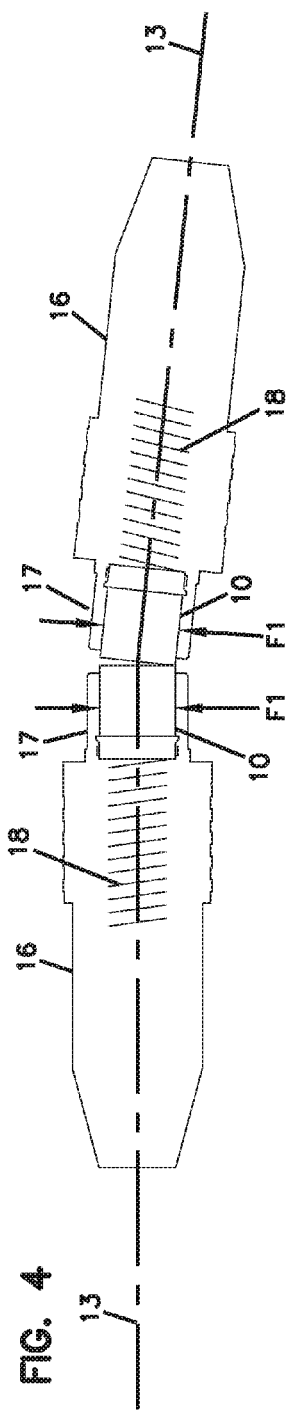
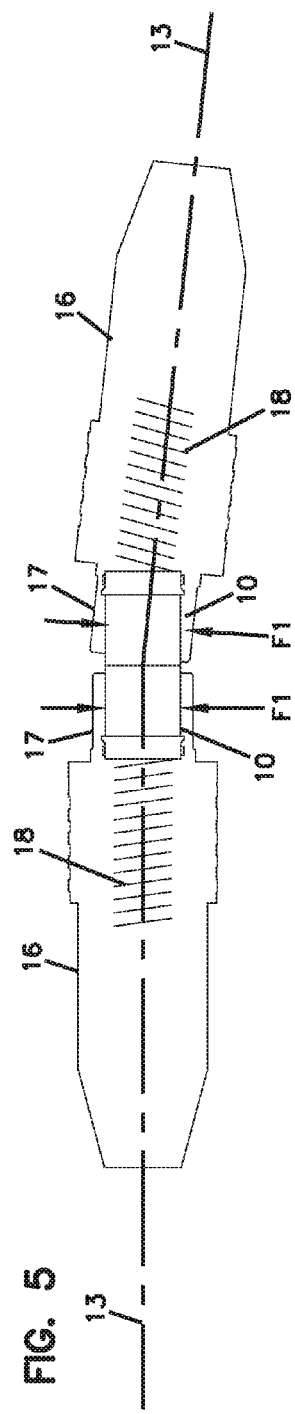

MULTI-FIBER CONNECTOR FOR USE WITH RIBBON FIBER OPTIC CABLE

CROSS-REFERENCE TO RELATED APPLICATION

The present application claims the benefit of U.S. Provisional Patent Application Ser. No. 62/233,041, filed Sep. 25, 2015, which application is hereby incorporated by reference in its entirety.

TECHNICAL FIELD

The present disclosure relates generally to fiber optic connectors. More particularly, the present disclosure relates to multi-fiber fiber optic connectors.

BACKGROUND

A multi-fiber fiber optic connector, for example an MPO connector, typically includes a connector housing supporting a multi-fiber ferrule at a distal end and a connector boot at a proximal end. A multi-fiber fiber optic connector can be sensitive to side forces on the connector housing, connector boot or cable. Example multi-fiber fiber optic connectors are disclosed by U.S. Pat. Nos. 5,214,730; 6,085,003 and 8,684,611.

SUMMARY

Aspects of the present disclosure relate to mechanical designs, features, configurations, and manufacturing methods incorporated into or otherwise used with multi-fiber fiber optic connectors for reducing sensitivity to side loading. It will be appreciated that side loading can be particularly problematic for multi-fiber fiber optic connectors terminating ribbon cables (i.e., fiber optic cables including optical fibers arranged in a planar array and held in the planar array by a polymeric matrix material so as to form an optical fiber ribbon). Thus, many aspects disclosed herein are well suited for use in fiber optic connectors adapted for termination of ribbon cables. However, certain aspects are also applicable to multi-fiber fiber connectors adapted for use with loose fiber cables (i.e., fiber optic cables including loose individual optical fiber typically contained within a buffer tube).

Aspects of the present disclosure relate to a multi-fiber fiber optic connector having a spring push including features to enhance spring seating and spring stability during side loading.

Aspects of the present disclosure also relate to a multi-fiber connector and cable assembly including a multi-fiber connector terminating the end of a ribbon fiber optic cable. The ribbon fiber optic cable includes ribbonized optical fibers arranged in a planar array and retained in the planar array by a ribbon matrix material. The optical fibers of the ribbon fiber optical cable are broken out from the ribbon matrix material within a connector body of the multi-fiber connector so that the optical fibers within the connector body do not have a preferred bending direction which interferes with the ability of a ferrule to float within a body of the connector. In this way, when the ferrule is mated within another ferrule, the ferrule can float to a tilted position relative to the connector body to maintain physical contact with a mated ferrule during side loading.

Aspects of the present disclosure also relate to a multi-fiber connector and cable assembly including a multi-fiber connector terminating the end of a ribbon fiber optic cable. The ribbon fiber optic cable includes ribbonized optical fibers arranged in a planar array and retained in the planar array by a ribbon matrix material. The ribbonized optical fibers has a ribbon profile defining a major axis and a minor axis. The ribbonized optical fiber bend preferentially along the minor axis and The multi-fiber fiber optic connector includes a connector boot with a boot opening through which the ribbonized optical fibers are routed. The boot opening is substantially larger than a width of the ribbonized array of optical fibers so that movement of the ribbonized optical fiber array along the non-preferred bending direction is not substantially limited by the connector boot.

BRIEF DESCRIPTION OF THE DRAWINGS

FIG. 3 shows two multi-fiber connectors in an ideally connected state;

FIG. 4 shows two multi-fiber connectors with a side load applied to the right multi-fiber optic connector causing the ferrules of the fiber optic connectors to lose effective physical contact;

FIG. 5 shows two multi-fiber connectors with a side load applied to the right multi-fiber optic connector and the ferrule of the right multi-fiber optical connector having floated to a tilted position to maintain effective physical contact between the ferrules of the multi-fiber optical connectors;

DESCRIPTION

Figure 1:
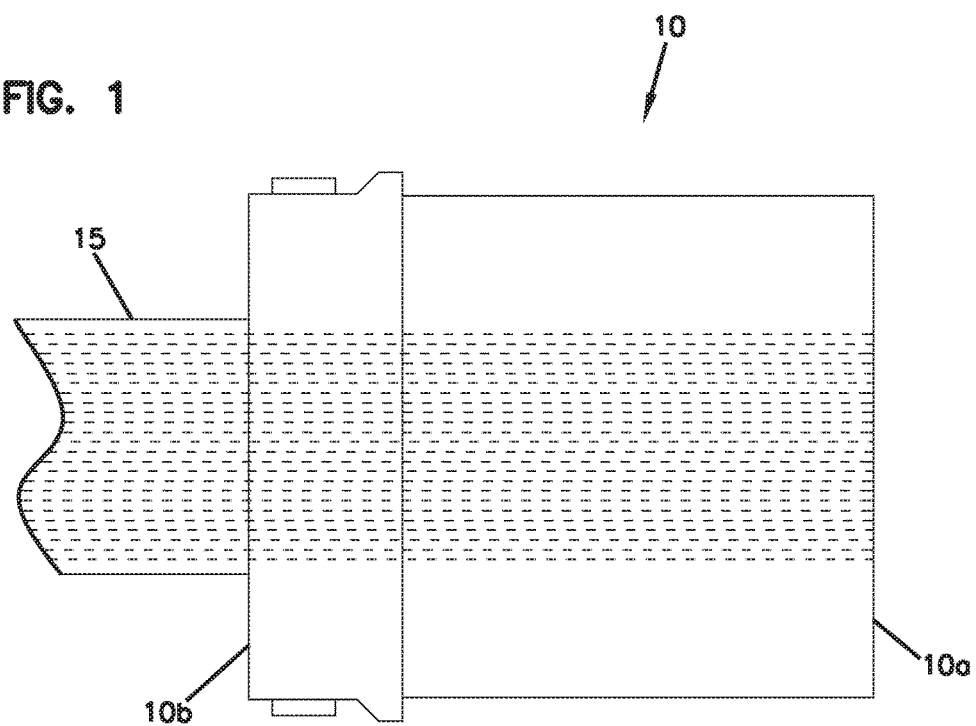
FIG. 1 is a side view of an example multi-fiber ferrule supporting a plurality of optical fibers of an optical fiber ribbon.
Figure 2:
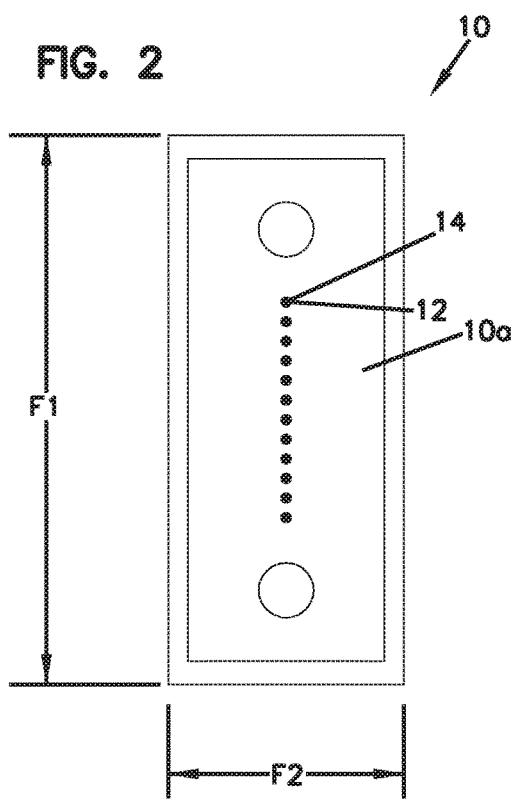
FIG. 2 is a distal end view of the ferrule of FIG. 1.

Aspects of the present disclosure relate to multi-fiber fiber optic connectors. Multi-fiber fiber optic connectors generally include multi-fiber ferrules. An example multi-fiber ferrule 10 is shown at FIGS. 1 and 2. The multi-fiber ferrule 10 includes a distal end 10a (i.e., a front end or free end) and a proximal end 10b (i.e., a base end or a rear end). The multi-fiber ferrule 10 defines one or more rows of fiber openings 12 for receiving optical fibers 14. When the multi-fiber connector is mounted to a fiber optic ribbon cable, the optical fibers 14 can be part of an optical ribbon 15. The ferrule 10 can include a rectangular ferrule profile defining a major dimension F1 and a minor dimension F2 that are perpendicular relative to one another. The row (s) of optical fibers 14 extend along the major dimension F1.

As used herein, the major dimension of a profile represents the largest dimension of the profile and the minor dimension represents the smallest dimension of the profile. Thus, the major dimension is longer than the minor dimension.

FIGS. 3-5 show multi-fiber fiber optic connectors 16 in various connected states. The multi-fiber connectors 16 include connector bodies 17 in which the multi-fiber ferrules 10 are mounted. The multi-fiber connectors 16 define longitudinal connector axes 13. The multi-fiber connectors 16 can include springs 18 that bias the ferrules 10 in a distal direction relative to each corresponding connector body 17. The springs 18 can have base ends that are supported by and seated upon spring stops (not shown) of the fiber optic connectors 16. When two of the fiber optic connectors 16 are connected together, the ferrules 10 are forced in a proximal direction against the bias of the corresponding springs 18 and the ends of the optical fibers 14 are co-axially aligned with one another so that light signals can pass between the optical fibers 14. Ideally, the springs 18 allow the ferrules 10 to "float" relative to the connector bodies 17 such that the ferrules can move in the distal-to-proximal orientation and tilt/pivot relative to the connector bodies 17 along planes that includes the major dimensions F1 of the ferrules and the longitudinal connector axes 13 of the multi-fiber connectors 16. FIG. 3 shows two connectors 16 in a perfectly mated state. FIG. 4 shows two mated connectors 16 in a state where a side load has been applied to one of the connectors causing the ferrules 10 to lose physical contact with each other. In FIG. 4, interference within the right connector 16 has prevented the multi-fiber ferrule 10 from tilting relative to the connector body 17 to maintain physical contact with the ferrule 10 of the mated connector 16. Thus, the connection of FIG. 4 can lead to unacceptable signal loss. FIG. 5 shows two mated connectors 16 in a state where a side load has been applied to one of the connectors 16 and the ferrule 10 of the side loaded connector 16 has floated to maintain effective physical contact with the ferrule 10 of the mated connector 16. Because of the effective physical contact in the connection of FIG. 5, signal loss is minimal despite the side loading.

Side loading can also have other undesirable effects. For example, under certain side load conditions, the spring 18 can become unseated from the spring stop of the corresponding connector 16 thereby causing the spring 18 to be lodged in a tilted or misaligned position. Such spring misalignment can affect the sensitivity and effectiveness of the communication between mated connectors 16 because it can force the ferrules into optical misalignment.

Aspects of the present disclosure relate to features and methods adapted to allow multi-fiber fiber optic connectors to withstand side loading without compromising signal quality. Certain features are designed to enhance the ability of a multi-fiber ferrule to float relative to its corresponding connector body. Other features are designed to provide enhanced seating of the connector spring within the connector. Other features represent an effective balance between spring seating and ferrule floatability.

Figure 6:
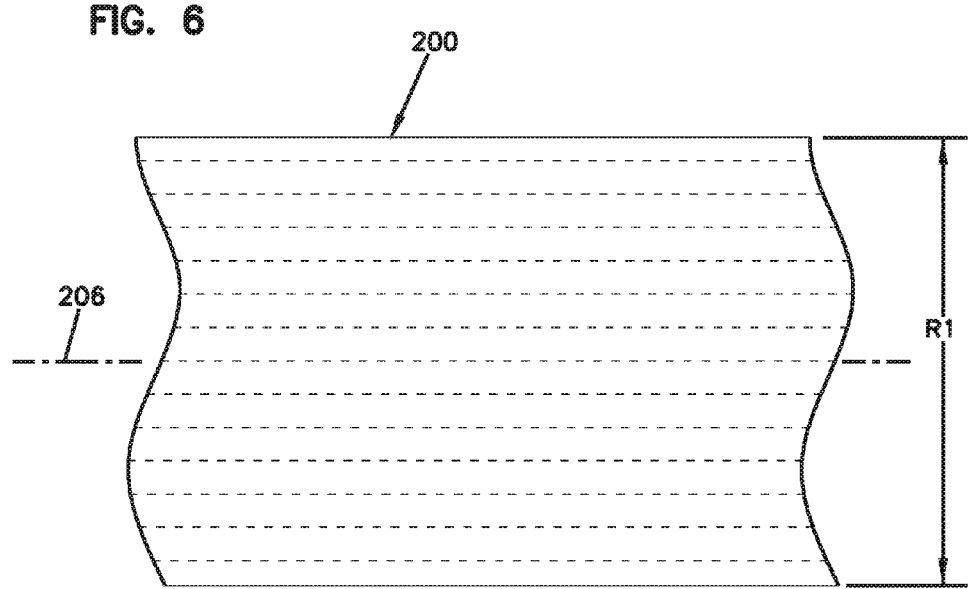
FIG. 6 is a side view of an example optical fiber ribbon.
Figure 7:
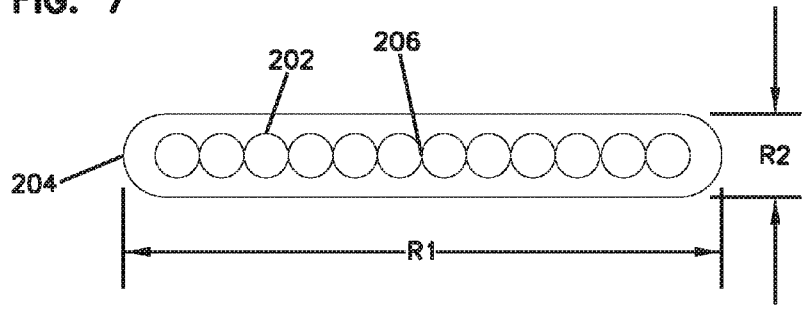
FIG. 7 is a transverse cross-sectional view of the optical fiber ribbon of FIG. 6.

Side loading can present particular issues to multi-fiber fiber optic connectors adapted for use with ribbon style optical cables. Such issues can relate to the structural characteristics of ribbon fiber. FIGS. 6 and 7 show an example section of optical fiber ribbon 200. The optical fiber ribbon 200 includes a plurality of optical fibers 202 arranged in a row to form a planar array. The optical fibers 202 are encased within a polymeric matrix material 204 that holds the optical fiber 202 together in the planar array. The optical fiber ribbon 200 has a length that extends along a ribbon axis 206. The optical fiber ribbon 200 also has a transverse cross-sectional profile defining a major dimension R1 that extends along the fiber row and a minor dimension R2 that is perpendicular to the major dimension R1 and the fiber row.

The shape of the transverse cross-sectional profile of the optical fiber ribbon 200 allows the optical fiber ribbon 200 to bend easily along a first plane that includes the minor dimension R2 and the ribbon axis 206, but resists bending along a second plane that includes the major dimension R1 and the ribbon axis 206. When the optical fiber ribbon 200 is routed through a multi-fiber connector, the major dimension R1 is parallel to the major dimension F1 of the ferrule 10. The resistance to bending of the optical fiber ribbon 200 along the second plane can inhibit the ferrule 10 from free floating to a position where the ferrule 10 tilts/pivots along its major dimension F1. This is particularly true where insufficient space is provided with the connector body for allowing the optical fiber ribbon 200 to move within the connector along its major dimension R1 to accommodate pivoting of the ferrule 10. In such cases, contact between the optical fiber ribbon 20 and the connector body limits the ability of the ferrule 10 to pivot along its major dimension F1.

A typical multi-fiber connector has a set form factor and cannot practically be enlarged. Additionally, there is also need to utilize the limited space within the connector body to provide a spring seat for supporting the base end of the connector spring. Thus, the need to provide space for allowing movement of the optical fiber ribbon along its major axis and the need to provide stable support of the connector spring represent competing interests. Aspects of the present disclosure represent an effective balance between these competing interests.

Figure 8:
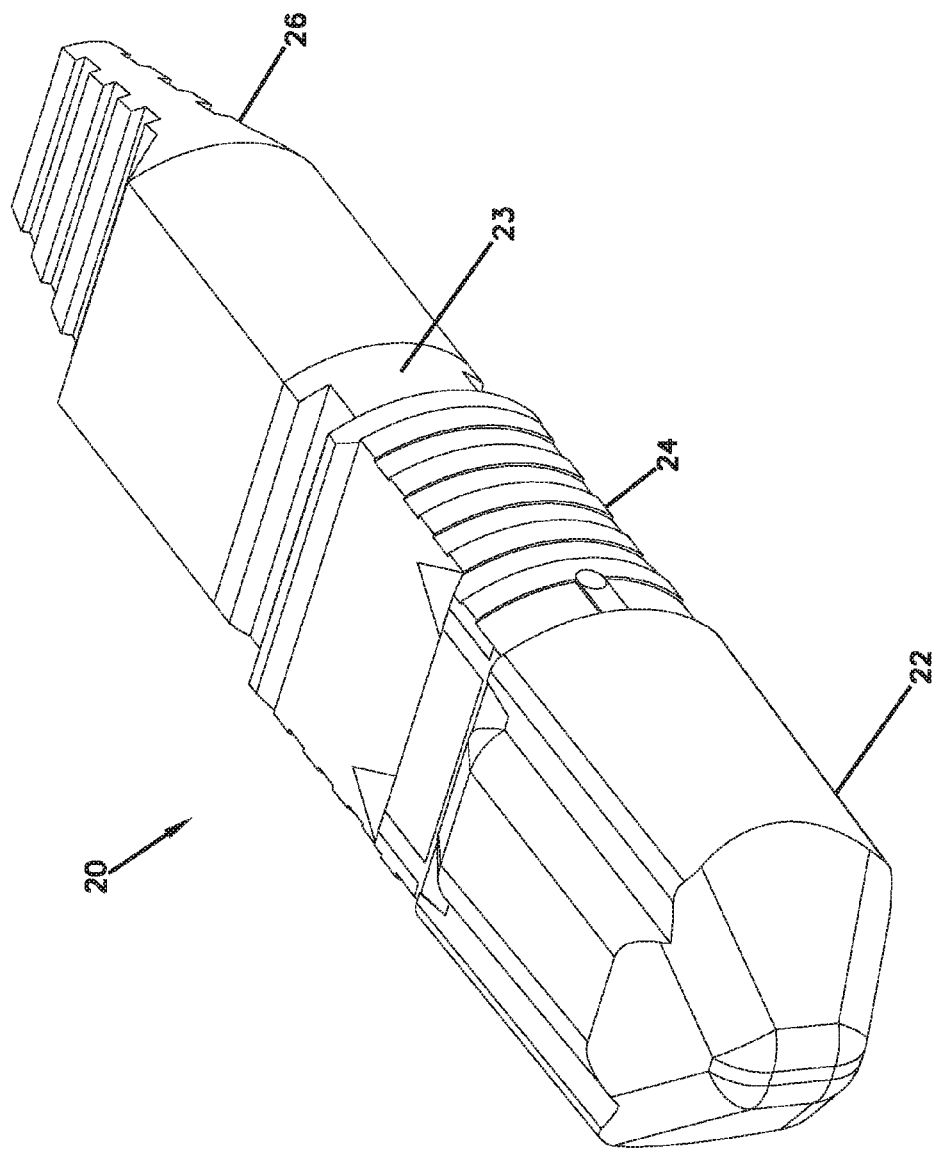
FIG. 8 shows a multi-fiber optical connector in accordance with the principles of the present disclosure.

FIG. 8 depicts an example assembled a ribbon cable connector 20 in accordance with the principles of the present disclosure. The depicted ribbon cable connector 20 can have a dust cap 22, a connector body 23, a release sleeve 24, a spring push 28 (see FIG. 9) and a connector boot 26. The dust cap 22 mounts over a distal end 23a (see FIG. 9) of the connector body 23 and the spring push 28 loads into a proximal end 23b (see FIG. 9) of the connector body 23. The release sleeve 24 is mounted on the connector body 23 and can slide over a limited range of movement in the distal-proximal orientation relative to the connector body 23. The release sleeve 24 can be spring biased in the distal direction and can be retracted from the distal position to release the connector 20 from a mating fiber optic adapter (not shown). The connector boot 26 mounts over a proximal end of the spring push 28.

Figure 9:
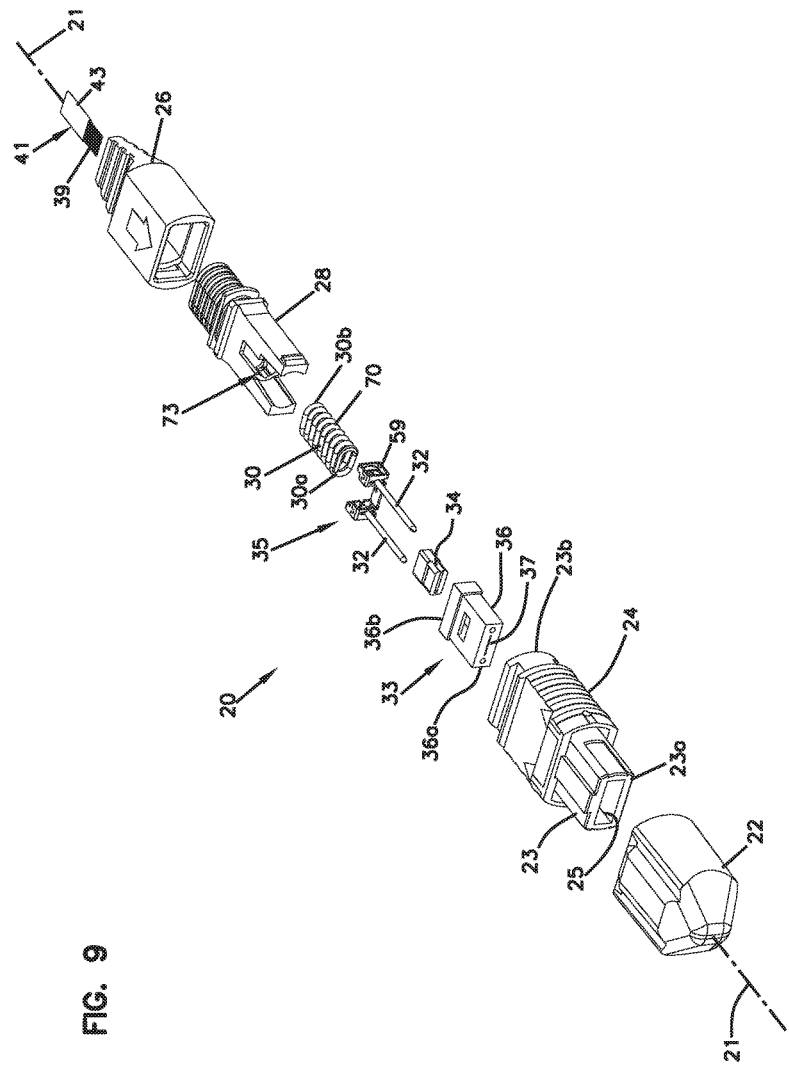
FIG. 9 is an exploded view of the multi-fiber optical connector of FIG. 8.

FIG. 9 particularly depicts the example assembled ribbon cable connector 20 (FIG. 8) in a disassembled state, showing additional elements operably contained within. The elements of the ribbon cable connector 20 are aligned along a central longitudinal axis 21. As depicted, the connector body 23 can have an internal passageway 25 having a length that extends along the central longitudinal axis 21 from the distal end 23a to the proximal end 23b.

Figure 10:
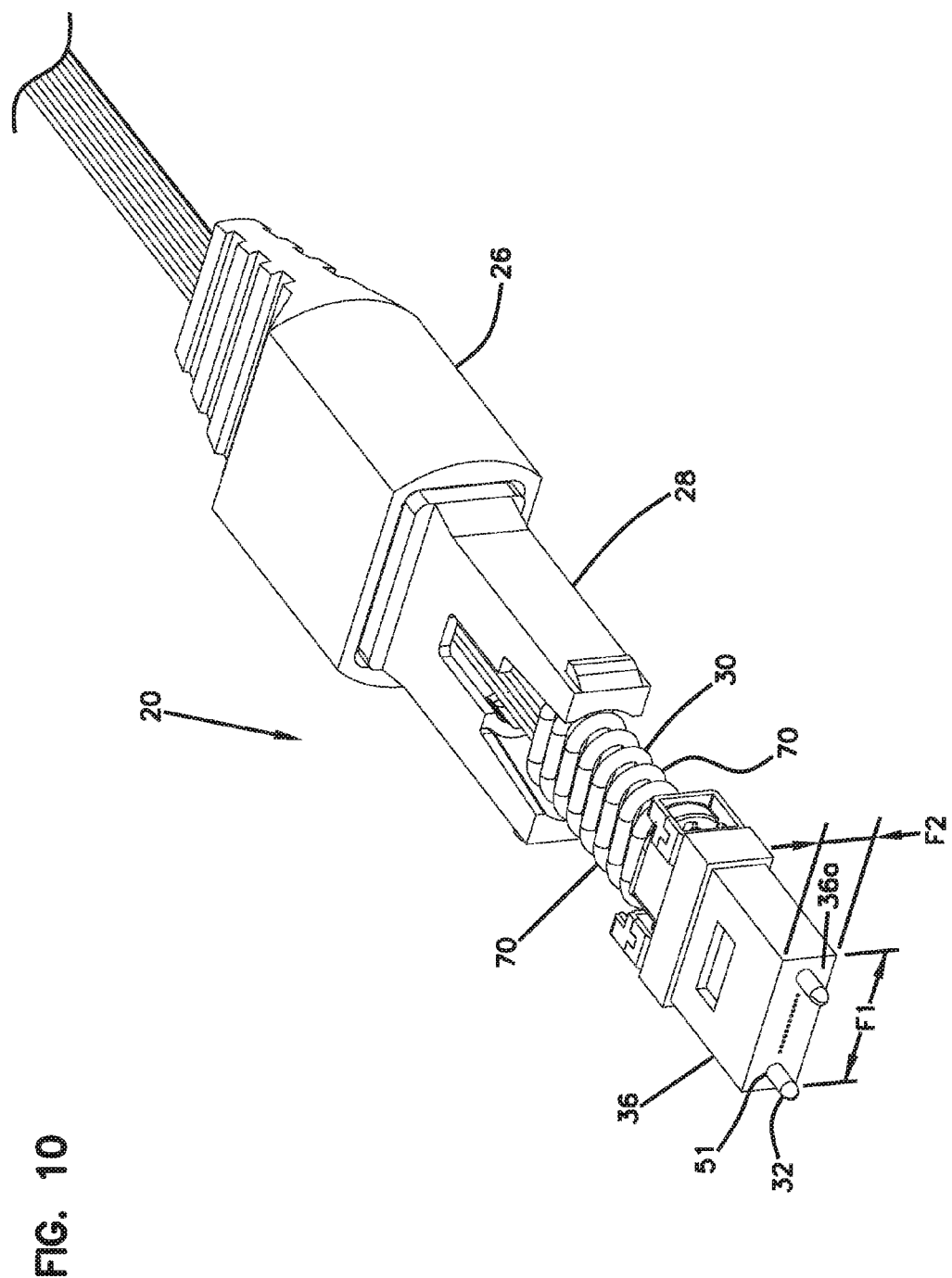
FIG. 10 is a partially assembled view of the multi-fiber optical connector of FIG. 9.

Referring to FIGS. 9 and 10, a ferrule assembly 33 mounts within the ferrule passageway 25 of the connector body 23. The ferrule assembly 33 includes a multi-fiber ferrule 36 having a distal end 36a and a proximal end 36b. The ferrule 36 defines a row of fiber openings 37 that extend through the distal end 36a of the ferrule 36 in distal-to-proximal direction. The fiber openings 37 are adapted for supporting the ends of optical fibers 39 broken out from a matrix material 43 an optical fiber ribbon 41. In certain examples, end faces of the optical fibers 39 are positioned at the distal end 36a of the ferrule 36. When the ferrule 36 is assembled within the connector body 23, the distal end 36a of the ferrule 36 is accessible at the distal end 23a of the connector body 23 so as to facilitate making an optical connection with another multi-fiber fiber optic connector.

Referring to FIG. 9, the ferrule assembly 33 further includes a ferrule boot 34 that mounts at the proximal end 36b of the ferrule 36. The ferrule boot 34 is adapted for receiving and guiding the fiber ribbons 41 into the ferrule 36. The ferrule assembly 33 further includes an alignment pin assembly 35. The alignment pin assembly 35 includes alignment pins 32 having base ends supported within a pin base 59. The alignment pins fit within longitudinal pin openings 51 defined by the ferrule 36. The pin openings 51 can be positioned on opposite sides of the rows of fiber openings 37. The pin base 59 mounts at the proximal end 36b of the ferrule 36. As so mounted, the pins 32 project distally beyond the distal end 36a of the ferrule 36. Thus, the depicted ferrule corresponds to a "male" multi-fiber connector. In use, the pins 36 are adapted to fit within corresponding pin openings defined by a mating female multi-fiber ferrule to provide alignment between the optical fibers of the mated ferrules. It will be appreciated that, in a female version of the ferrule 36, the pin base 59 can support shorter pins that extend only a relatively short distance distally into the pin openings 51 such that distal portions of the pin openings 51 are open.

As indicated above, the ferrule 36 is a multi-fiber ferrule. The proximal end 36b of the ferrule 36 defines a ferrule profile having a major dimension F1 and a minor dimension F2 that are perpendicular to one another. The fiber openings 37 are aligned a row that extends along the major dimension F1. In other examples, more than one row of fiber openings can be provided with each row corresponding to a separate optical fiber ribbon. In certain examples, each row can accommodate 12 optical fibers.

Figure 11:
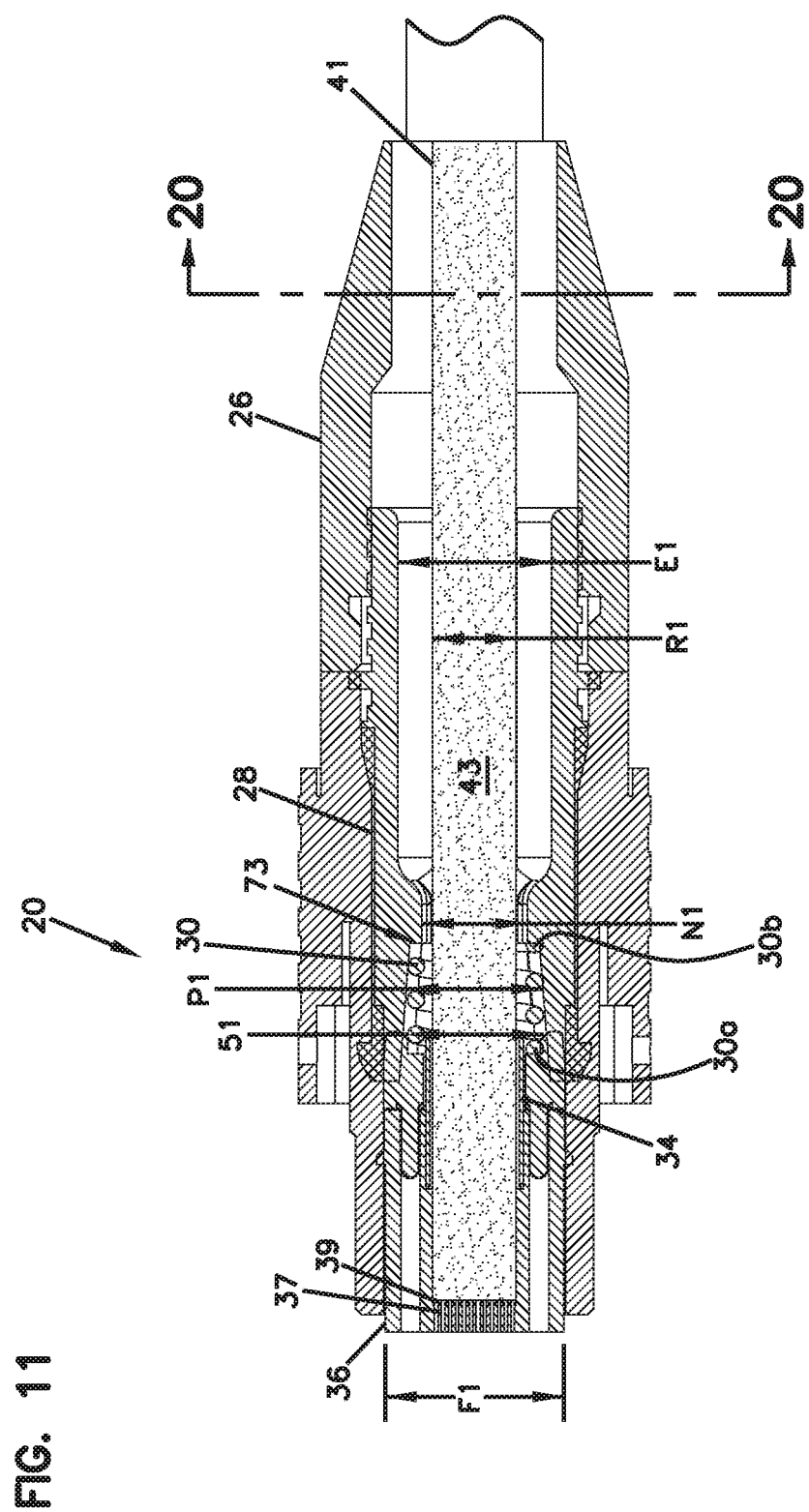
FIG. 11 is a longitudinal cross-sectional view of the multi-fiber optical connector of FIG. 9.

Referring to FIG. 11, the optical fiber ribbon 41 extends through the connector body 23. At a distal end of the optical fiber ribbon 41, the matrix material 43 of the optical fiber ribbon 41 has been removed so that the end portions of the optical fibers 39 within the openings 37 are bare glass (i.e., each fiber includes only a core surrounded by cladding). The remainder of the optical fiber ribbon 41 within the connector body 23 is ribbonized and includes the matrix material 43 which bonds the optical fibers 37 together in a planar array. As the optical fiber ribbon 41 extends through connector body 23, the ribbonized section of the ribbon fiber optic cable 41 extends through the ferrule boot 34, a spring 30 and the spring push 28. The ribbonized section of the ribbon fiber optic cable exits the multi-fiber connector through the connector boot 26. The connector 20 includes internal features that accommodate movement of the optical fiber ribbon along its major dimension R1 so that the optical fiber ribbon does not interfere with tilting of the ferrule 36 during side loading of the fiber optic connector 20.

The optical fiber ribbon 41 can form or be part of a cable to which the multi-fiber connector 20 is mounted. For example, the optical fiber ribbon can by itself form the cable. In other examples, the cable can include the optical fiber ribbon and a protective jacket or sheath surrounding the optical fiber ribbon. In still other examples, the cable can include the optical fiber ribbon, a protective jacket and one or more strength members such as aramid yarn. The strength members can be coupled (e.g., crimped) to a proximal end of the spring push of the fiber optic connector 20.

Figure 18:
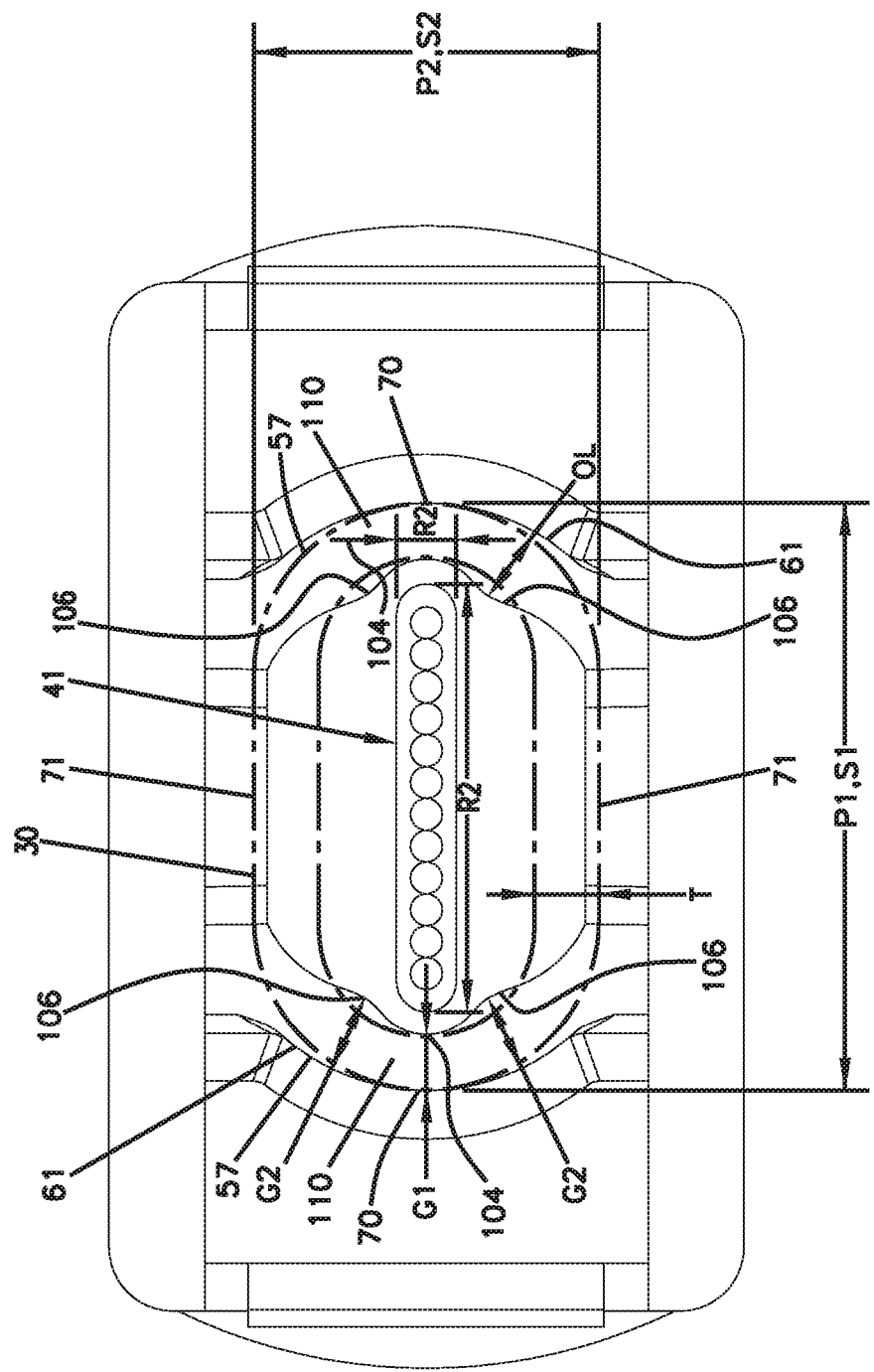
FIG. 18 is a distal end view of the spring push of FIG. 12 with a profile of a connector spring superimposed thereover and with an optical fiber ribbon shown.

The spring 30 of the multi-fiber connector 20 functions to bias the ferrule 36 in a distal direction relative to the connector body 23. The spring 30 can have an elongate transverse cross-sectional profile (See FIG. 18) that defines a major dimension S1 and a perpendicular minor dimension S2. The profile of the spring 30 can include rounded ends 70 separated by the major dimension S1. The spring profile can also include parallel sides 71 separated by the minor dimension S2. The parallel sides 71 can extend between the rounded ends 70. When the connector 20 is assembled, the spring 30 can be captured between the proximal end 36b of the ferrule 36 and a spring seat 73 of the spring push 28. A distal end 30a of the spring 30 can engage the pin base 59 of the ferrule assembly and a proximal end 30b of the spring 30 can engage the spring seat 73 of the spring push 28. The major dimension S1 of the spring 30 is parallel to the major dimension F1 of the ferrule 36 and the major dimension R1 of the optical fiber ribbon 41. The optical fiber ribbon 41 passes through an interior of the spring 30.

In certain examples, the spring 30 includes a coiled wire having a thickness T. In certain examples, the wire has a round transverse cross-sectional shape and the thickness T is equal to a diameter of the round transverse cross-sectional shape of the wire.

Referring to FIGS. 12-15, the spring push 28 includes a distal end 28a and a proximal end 28b. The spring push 28 includes a pair of latch arms 42 at the distal end 28a. The latch arms 42 include latching tabs 43 that snap within corresponding receptacles defined within the connector body 23 when the spring push 28 is loaded into the proximal end 23b of the connector body 23. In this way, the latch arms 42 function to retain the spring push 28 at a fixed axial position within the internal passageway 25 of the connector body 23. The spring push 28 can include cut-out portions 45 that enhance the flexibility of the latch arms 42 to allow the latch arms to flex together during insertion of the spring push into the proximal end 23b of the connector body 23. When the spring push 28 is inserted fully in the connector body 23, the latch arms snap outwardly to a retaining position in engagement with the connector body 23.

Figure 12:
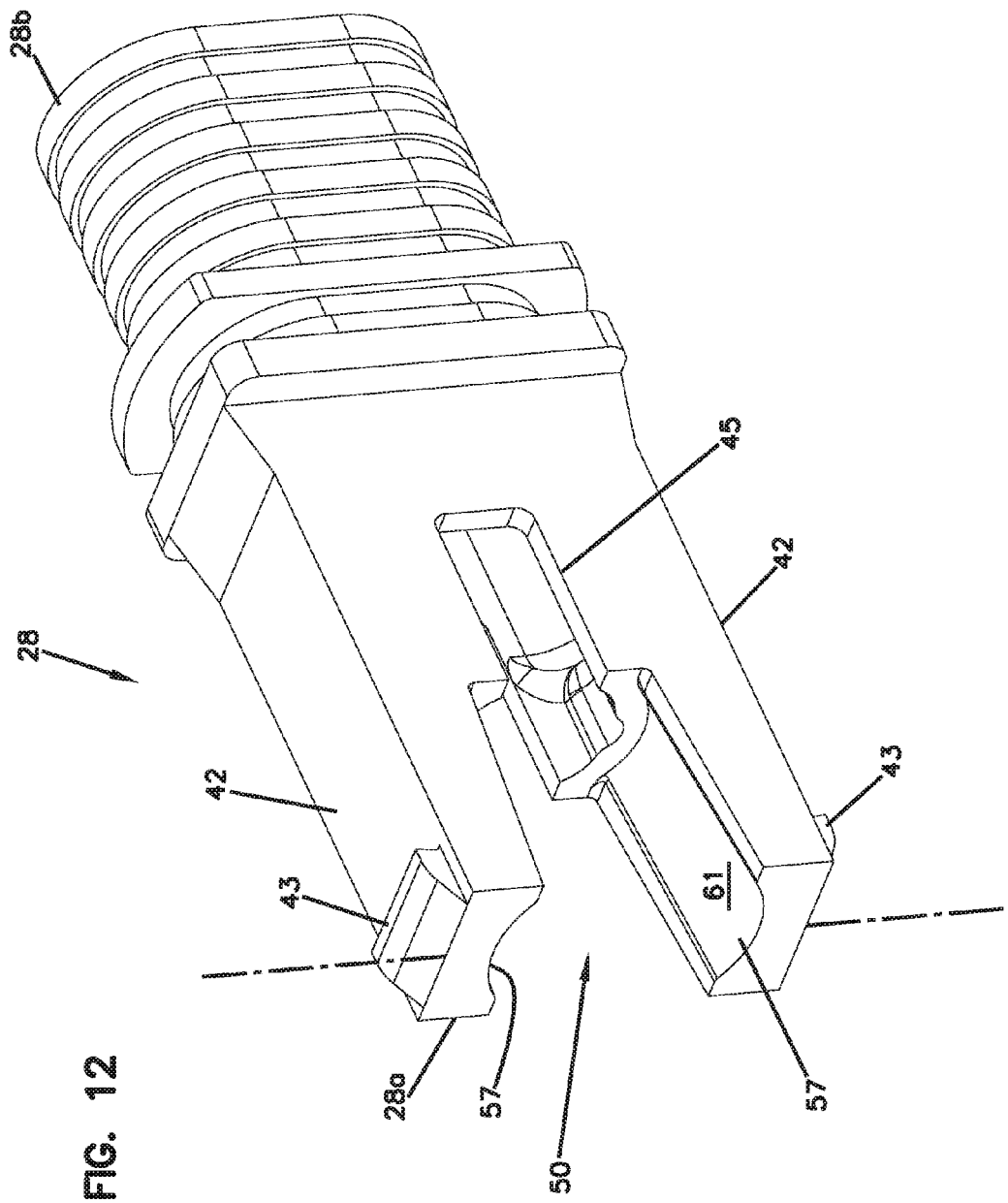
FIG. 12 is a distal, side perspective view of a spring push of the multi-fiber fiber optic connector assembly of FIG. 9.
Figure 13:
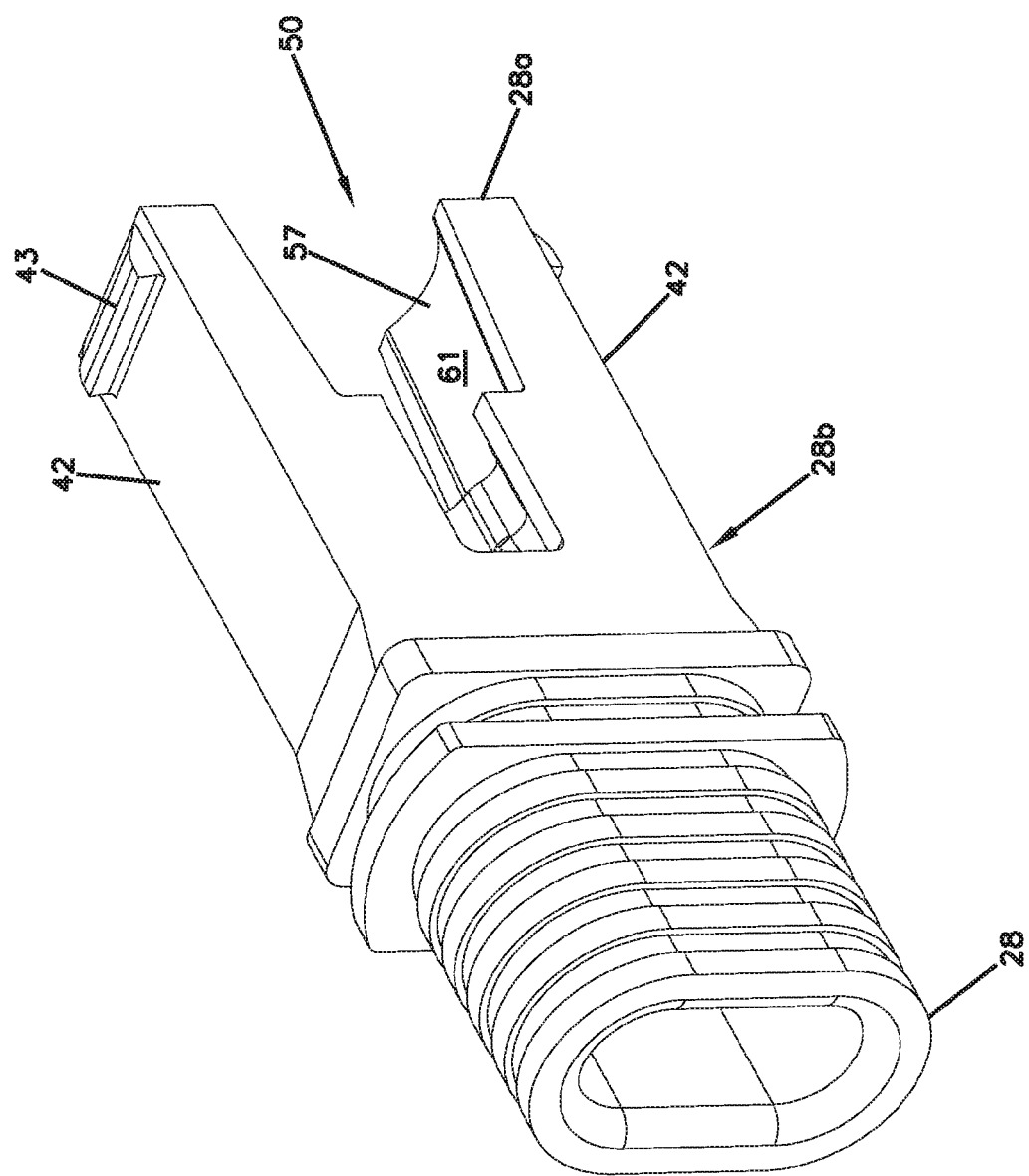
FIG. 13 is a proximal, side perspective view of the spring push shown in FIG. 12.

As shown at FIG. 12, the latch arms 42 cooperate to define a spring pocket 50 configured for receiving the proximal end 30B of the spring 30. The spring pocket 50 has an elongated transverse cross-sectional profile having a major dimension P1 and a minor dimension P2 that are perpendicular to one another. The major dimension P2 is parallel to the major dimension F1 of the ferrule 36, the major dimension of the optical fiber ribbon R1, and the major dimension S1 of the spring 30. The spring pocket profile has rounded ends 57 separated by the major dimension P1 and open sides separated by the minor dimension P2. The rounded ends 57 function as receptacles for receiving the rounded ends 70 of the spring profile. The rounded ends 57 are defined by opposing inner surfaces 61 of the latch arms 42. The rounded ends 57 of the spring pocket profile 42 extend from the distal end 28a of the spring push 28 to the spring seat 73.

Figure 16:
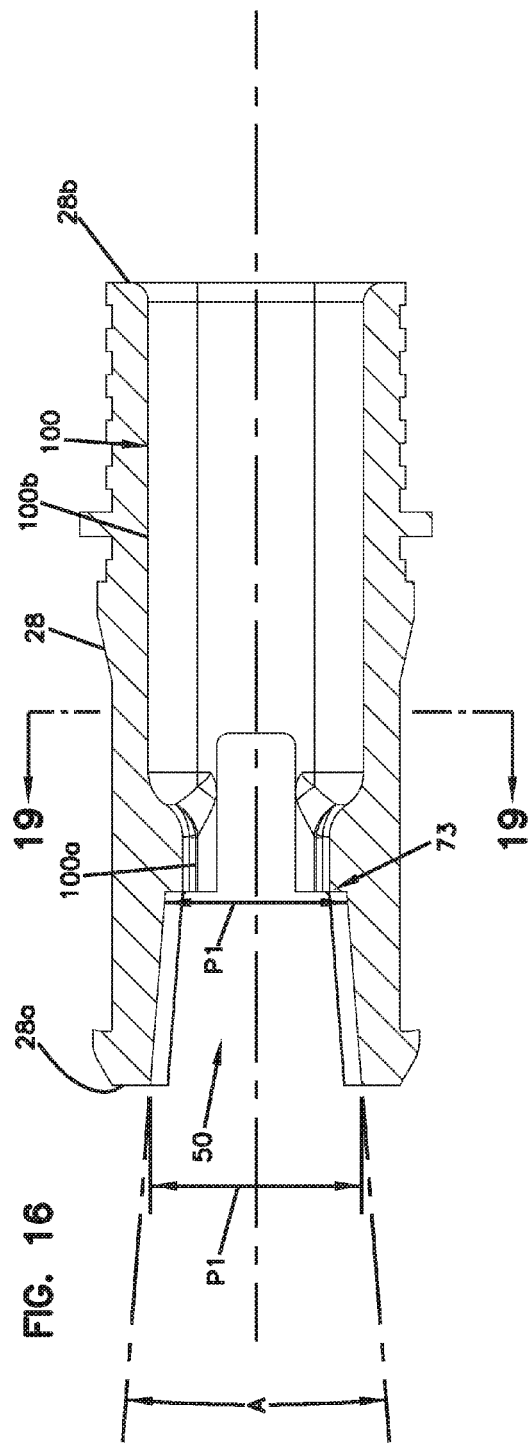
FIG. 16 is a cross-sectional view of the spring push shown in FIG. 12, taken along section line 16-16 of FIG. 15.

As shown at FIG. 16, the spring pocket 50 can be configured to taper inwardly along the major dimension P1 as the spring pocket 50 extends in a proximal direction from the distal end 28a of the spring push 28 toward the spring seat 73. The taper causes the major dimension P1 of the spring pocket 50 at the distal end 28a of the spring push 28 to be larger than the major dimension P1 of the spring pocket 50 at the spring seat 73. In certain examples, the opposing inwardly facing surfaces 61 of the latch arms 42 can define a taper angle A that is greater than 8.4° as the surfaces 61 converge toward one another as the surfaces extend in a proximal direction from the distal end 28a of the spring push 28.

Figure 17:
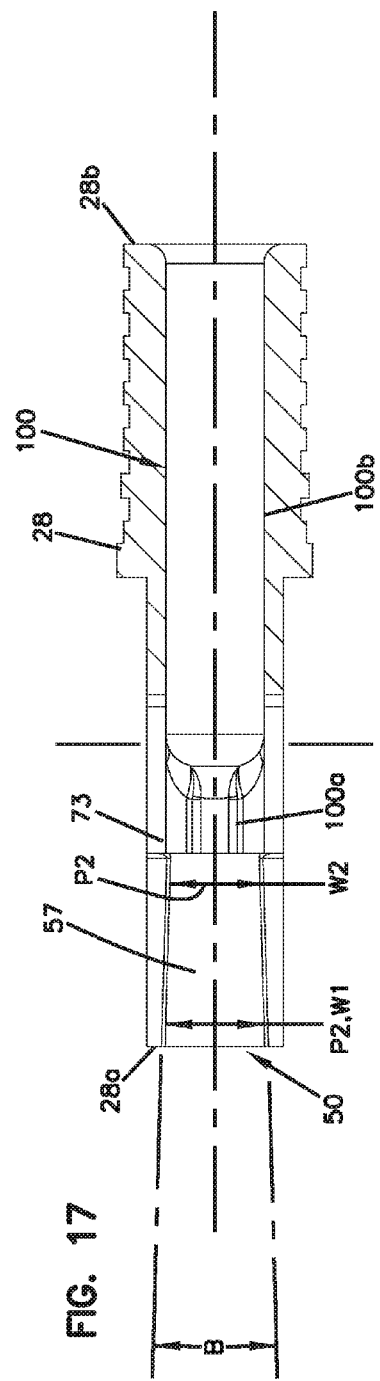
FIG. 17 is a cross-sectional view of the spring push shown in FIG. 12, taken along section line 17-17 of FIG. 15.

As shown at FIG. 17, the rounded ends 57 of the spring pocket profile can have widths W that reduce in size in a tapered configuration as the rounded ends 57 extend along the lengths of the latch arms 42 from the distal end 28a of the spring push 28 to the spring seat 73. The taped configuration defines an angle B. The widths W are measured in an orientation generally along the minor dimension P2. A dimension W1 of the rounded ends 57 adjacent the distal ends of the latch arms 42 is larger than a dimension W2 of the rounded ends 57 at the spring seat 73.

In view of the taper angles A and B of the spring pocket 50, the proximal end 30b of the spring 30 has less clearance within the pocket 50 at the spring seat 73 as compared to at the distal end 28a of the spring push 28. In certain examples, the rounded ends 70 of the spring profile contact the opposing surfaces 61 of the latch arms 42 at the spring seat 73 so that no clearance is provided between the rounded ends 70 of the spring profile and rounded ends 57 of the pocket profile along the major axes S1, P1 adjacent the spring seat 73. In certain examples, the proximal end 30b of the spring 30 is compressed slightly within the pocket 50 along the major axis P1 of the spring profile. Thus, the base end of the spring 30 is held securely by the spring push 26 and prevented from moving laterally while the free end of the spring 30 can move laterally to accommodate floating of the ferrule 36.

Figure 19:
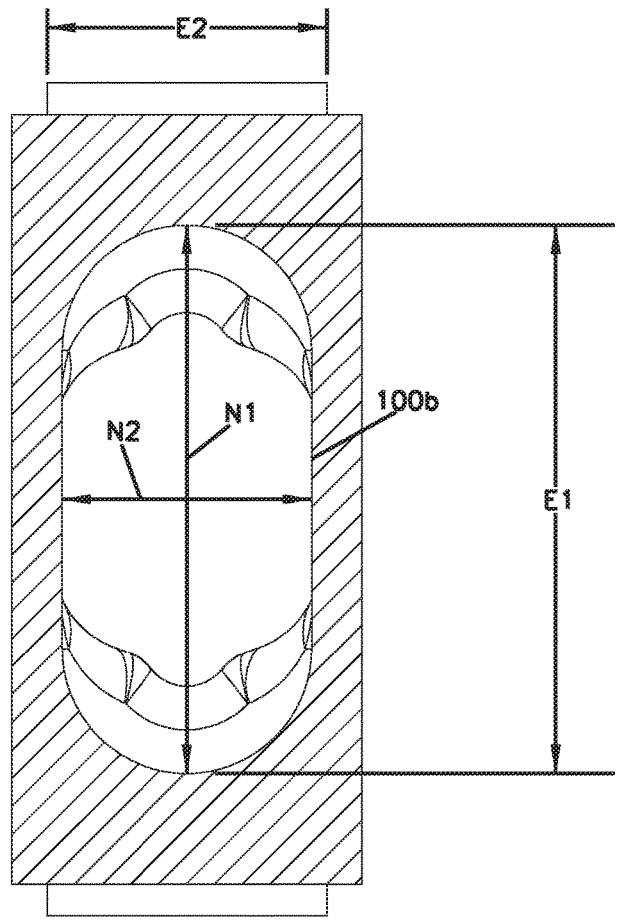
FIG. 19 is a cross-sectional view of the spring push shown in FIG. 12, taken along section line 19-19 of FIG. 16.

As shown at FIGS. 16 and 17, the spring push 28 can also include a ribbon fiber passage 100 that extends from the proximal end 28b to the spring seat 73. The ribbon fiber passage 100 can include a necked portion 100a and an enlarged portion 100b. The necked portion 100a can extend from the spring seat 73 to the enlarged portion 100b. The enlarged portion 100b can extend from the necked portion 100a to the proximal end 28b of the spring push 28. The necked portion 100a can be relatively short in axial length. In one example, the length of the necked portion 100a is less than 25 percent of a total length of the spring push 28 and less than 33 percent of an axial length of the enlarged portion 100b. The necked portion 100a has a transverse cross-sectional profile having major and minor dimensions N1, N2 (see FIG. 15) that are perpendicular to one another with the major dimension N1 being parallel to the major dimensions F1, R1, S1 and P1. The enlarged portion 100b has a transverse cross-sectional profile having major and minor dimensions E1, E2 (see FIG. 19) that are perpendicular to one another with the major dimension E1 being parallel to the major dimensions F1, R1, S1, P1 and N1. The major dimension E1 of the expanded portion 100b is substantially larger than the major dimension N1 of the necked portion 100a. In one example, the major dimension E1 of the expanded portion 100b is at least 25 percent larger than the major dimension N1 of the necked portion 100a.

It will be appreciated that the amount of internal clearance required for accommodating movement of the ribbon optical fiber related to ferrule-tilting along the major dimension F1 is directly related to the axial distance from the ferrule 36. Thus, since the necked portion 100a is fairly close to the ferrule 36, the size of the major dimension N1 is large enough to accommodate the required about of fiber ribbon movement even though the major dimension N1 is substantially smaller than the major dimension E1.

Figure 15:
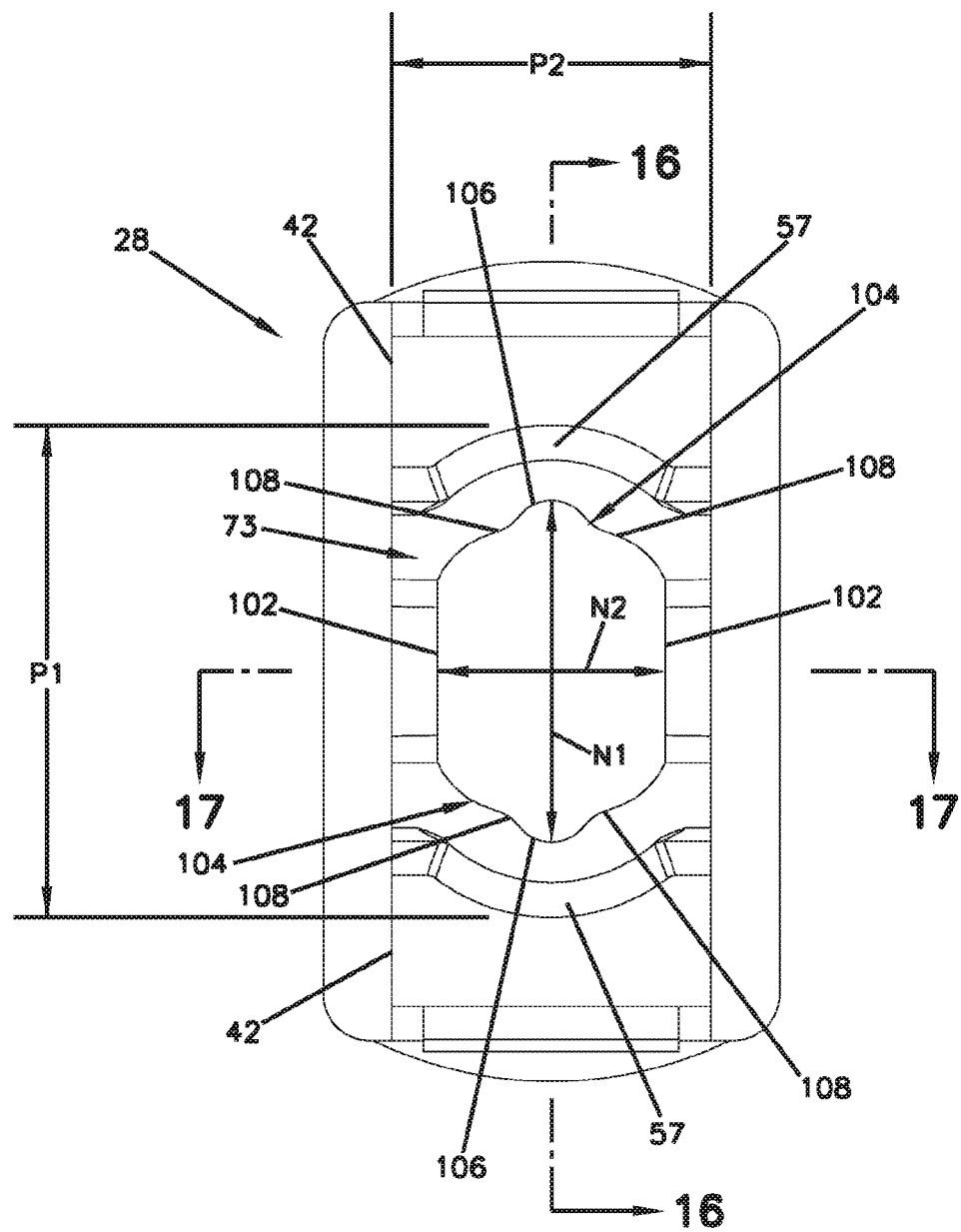
FIG. 15 is a distal view of the spring push shown in FIG. 12.

Referring to FIG. 15, the transverse cross-sectional profile of the necked portion 100a of the ribbon fiber passage 100 can include major sides 102 separated by the minor dimension N2 and shaped ends 104 separated by the major dimension N1. The major sides 102 can extend between the shaped ends 104. The shaped ends 104 can include central notch portions 106 aligned with the major dimension N1 that defines a maximum cross dimension of the transverse cross-sectional profile of the ribbon fiber passage 100a. The central notch portions 106 can include notches having concave curvatures. The shaped ends 104 can also include inward projections 108 positioned on opposite sides of the central notched portions 106. In certain examples, the inward projections 108 can have convex curvatures and can be configured as convex dimples.

Figure 14:
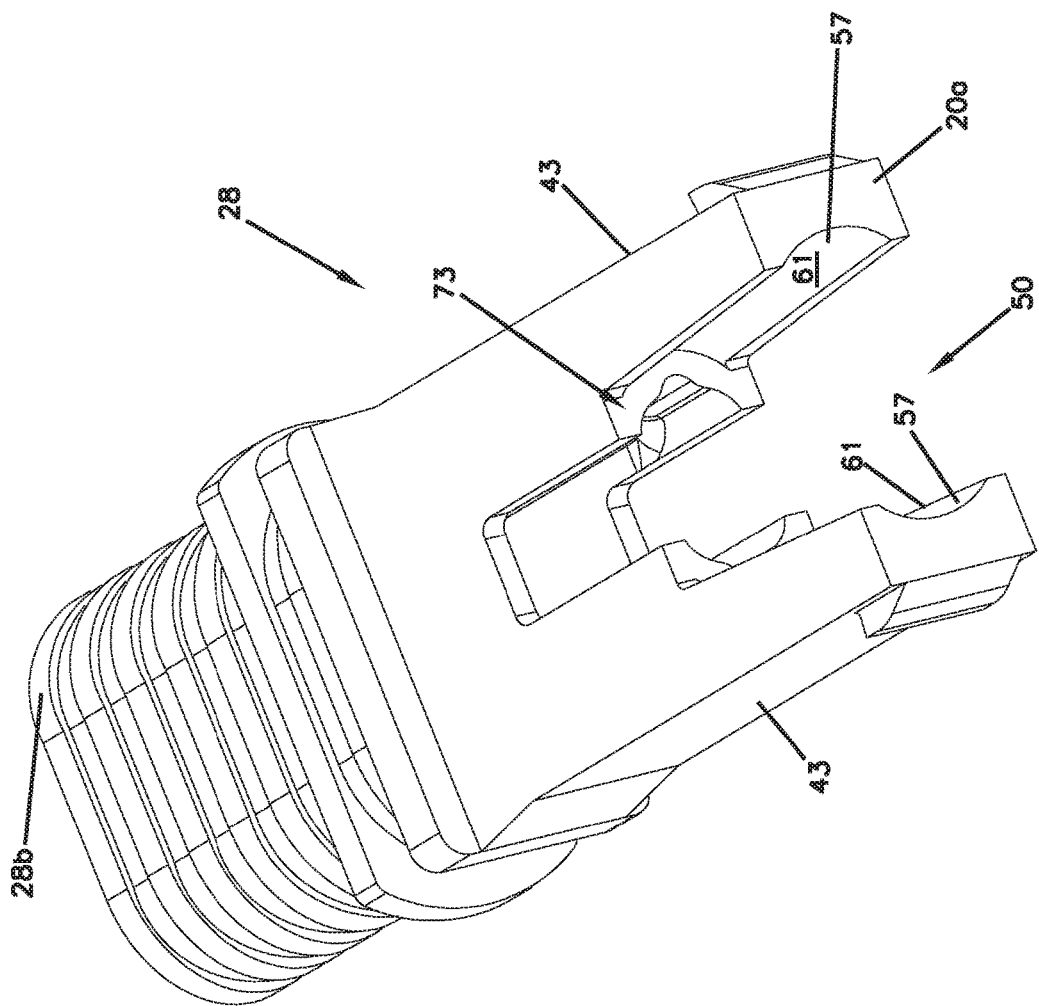
FIG. 14 is a distal, top perspective view of the spring push shown in FIG. 12.

The shape of the necked portion 100a of the fiber ribbon passage 100 is configured to accommodate movement of the fiber ribbon 41 along its major dimension R1 while also providing an enhanced shape for the spring seat 73 such that enhanced spring stability is provided. As shown at FIGS. 14 and 15, the spring seat 73 includes two spring support shelves 110 (i.e., ridges, shoulders, projections, surfaces, ledges, etc.) separated by the major dimension P1 of the spring pocket 50. Thus, the spring support shelves 110 are positioned at opposite ends of the elongated traverse cross-sectional profile of the spring pocket directly adjacent to the rounded ends 57 of the spring pocket profile (i.e., directly adjacent to the inner opposing surfaces 61 of the latch arms 42). The spring support shelves 110 can include support surfaces aligned in a plane generally perpendicular relative to the central longitudinal axis 21.

The spring support shelves 110 can each include a first shelf width G1 measured along the major dimension P1 of the spring pocket 50 and second shelf widths G2 positioned on opposite sides of the major dimension P1. The first shelf widths G1 can align with the central notch portions 106 of the necked portion 100a of the passage 100 and the second shelf widths G2 can align with the inward projections 108 of the necked portion 100a of the passage 100. The first shelf width G1 aligns with the major dimension N1 of the necked portion 100a of the passage 100. The second dimensions G2 are larger than the first dimensions G1. In certain examples, the second dimensions G2 are at least 10, 20, or 30 percent larger than the first dimensions G1. The dimensions G1, G2 are measured along orientations perpendicular relative to the rounded ends 57 of the spring pocket 50.

It will be appreciated that the spring seat 73 is configured to provide enhanced spring stability such that the base end of the spring is prevented from unseating when the spring tilts/bends to accommodate ferrule tilting. In certain examples, with the spring centered within the pocket 50, the spring support shelves 110 are sized such that the proximal end 30b of the spring 30 overlaps the spring support shelves 110 at the ends 70 of the spring 30 (see FIG. 18) by an overlap distance larger than a clearance distance between the ends 70 of the spring 30 and the opposing inner surfaces 61 of the latch arms 42 adjacent the spring seat 73. In certain examples, the clearance is substantially zero and the spring overlap at each end of the spring is at least 0.3, 0.4 or 0.5 millimeters. In certain examples, the spring support shelves 110 are configured to provide a spring overlap dimension OL that is equal to or greater than 0.5 times, 0.75 times or 1.0 times as large as the thickness T of the coil of the spring 30.

It will be appreciated that the connector boot 26 is configured to provide bend radius protection at the proximal end of the connector 20. In certain examples, the connector boot 26 is configured to press fit over the proximal end 28b of the spring push 28. In certain examples, a proximal portion of the connector boot 26 has an exterior shape that is tapered so as to taper inwardly as the proximal end extends in a proximal direction. In certain examples, the exterior tapered portion of the connector boot 26 can be segmented. In certain examples, the connector boot 26 is more flexible than the spring push 28 and the connector body 23. In certain examples, the connector boot 26 defines an internal ribbon passage 300 for receiving the fiber ribbon 41. The ribbon passage 300 has a transverse cross-sectional profile having a major dimension B1 and a minor dimension B2 that are perpendicular to one another. The major dimension B1 is parallel to the major dimensions F1, P1, S1, N1, R1 and E1. The major dimension B1 is significantly larger than the major dimension R1 of the fiber ribbon 41. In certain examples, the major dimension B1 of the passage 300 defined by the connector boot 26 is at least 25 percent, 50 percent or 100 larger than the major dimension R1 of the fiber ribbon 41. This difference in dimensions allows the fiber ribbon 41 to move relative to the connector boot 26 in the non-preferred bend direction of the fiber ribbon 41 to allow for tilting of the ferrule 36 without interference between the ribbon 41 and the boot 26.

Figure 20:
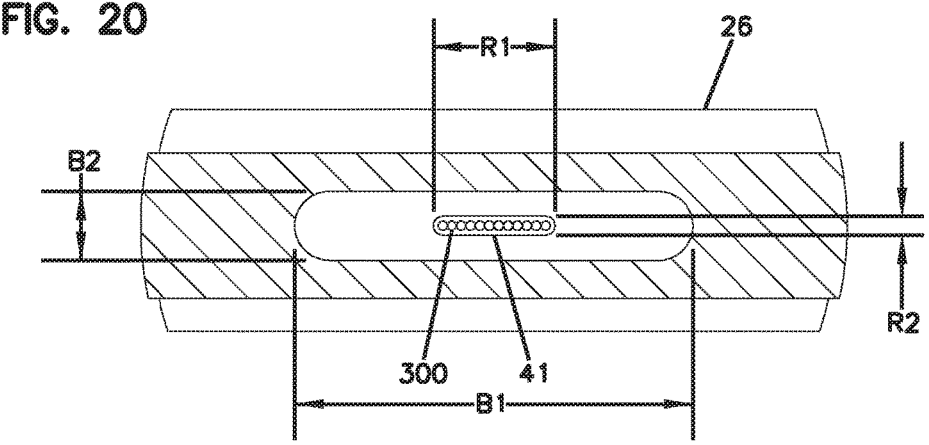
FIG. 20 is a cross-sectional view of the connector shown in FIG. 11, taken along section line 20-20 of FIG. 11.
Figure 21:
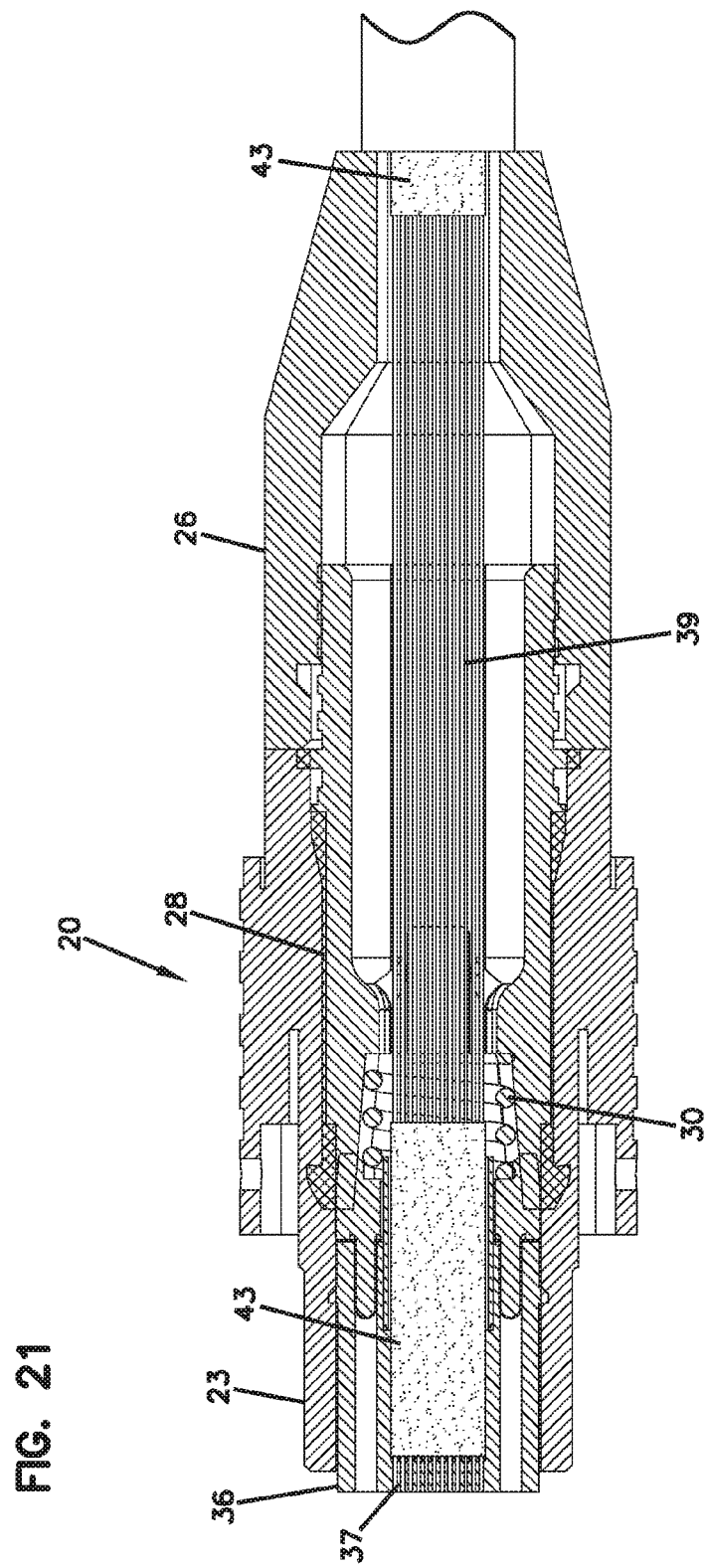
FIG. 21 is a longitudinal cross-sectional view of the multi-fiber optical connector of FIG. 9 with the optical fiber ribbon having a de-ribbonized section within the multi-fiber optical connector.

In certain examples, other features or methods may be used to enhance the ability of the ferrule 36 to float within the connector body 23. In certain examples, it may be desired to de-ribbonize the optical fibers 39 within the connector body 23 (see FIG. 20). By "de-ribbonize," it is meant that the matrix material 43 is decoupled from the optical fibers of the fiber ribbons 41 at the region within the connector body 23 and/or the spring push 28 and/or the connector boot 26 such that the optical fibers 39 are not coupled together and instead move as loose, individual fibers 39. In certain examples, the optical fibers 39 can be decoupled from the matrix material 43 by flexing the matrix material 43 so that the matrix material 43 de-bonds from the optical fibers 39 to form a de-ribbonized section 202. The de-bonded matrix material 43 at the de-ribbbonized section 202 can be removed from the optic fibers 39 or left in place. By de-bonding the matrix material 43 within the connector 20, the portions of the optical fibers 39 within the connector 20 will not have a preferred bending direction and will bend to accommodate floating of the ferrule 36 to a tilted position without interference from the interior of the connector 20.

In assembling the connector 20, the fiber ribbon 41 can be processed to remove the matrix material 43 from the distal ends of the optical fibers 39. Coating material can also be removed from the distal ends of the optical fibers 39. The fiber ribbon 41 then can be passed through the connector boot 26, the spring push 28, the spring 30 and the ferrule boot 34. The distal ends of the optical fibers 39 can then be loaded into the ferrule 36 and secured within the ferrule openings 37. The distal end face of the ferrule 36 can then be processed by polishing or other means. After polishing, the alignment pin assembly can be secured to the ferrule 36. Thereafter, a section of the fiber ribbon proximal of the ferrule corresponding to at least 10 percent, 20 percent, or 30 percent, 50 percent or 75 percent of the length of the connector 20 can be de-ribbonized to form a a de-ribbonized fiber section before the optical fiber ribbon 41 is loaded into the connector 20. The de-ribbonizing process can include de-bonding a section of matrix material corresponding to the length of the de-ribbonized fiber section from the optical fibers 39. In certain examples, as part of the de-ribbonizing process, the portion of the matrix material de-bonded from the optical fibers 39 can optionally be removed from the optical fibers 39. The ferrule assembly and the spring 30 are then loaded into the connector body 23 through the proximal end 23b of the connector body 23. Next, the spring push 28 is then snapped into the proximal end 23b of the connector body 23 to capture the spring 30 and the ferrule assembly within the connector body 23. Thereafter, the connector boot 26 is pressed over the proximal end 28b of the spring push 28.

Although specific examples of the disclosure have been described, numerous other modifications and alternative embodiments are within the scope of the disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. A multi-fiber optical connector comprising:
   a connector body having a distal end and a proximal end;
   a multi-fiber ferrule having an end face accessible at the distal end of the connector body, the multi-fiber ferrule having a ferrule transverse cross-sectional profile having a major dimension F1 oriented perpendicular relative to a minor dimension F2, the multi-fiber ferrule defining a row of fiber openings for supporting optical fibers, the row of fiber openings extending along the major dimension F1;
   a spring for biasing the multi-fiber ferrule in a distal direction relative to the connector body, the spring having a spring transverse cross-sectional profile having a major dimension S1 parallel to major dimension F1 and a minor dimension S2 parallel to the minor dimension F2, the spring transverse cross-sectional profile having rounded ends separated by the major dimension S1;
   a spring push for capturing the spring and the ferrule within the connector body, the spring push having a distal end and a proximal end, the spring push including latch arms at the distal end for securing the spring push within the proximal end of the connector body, the spring push defining a spring pocket between the latch arms for receiving a proximal end of the spring, the spring pocket having a pocket transverse cross-sectional profile having a major dimension P1 parallel to the major dimension S1 and a minor dimension P2 parallel to the minor dimension S2, the pocket transverse cross-sectional profile having rounded ends separated by the major dimension P1 that receive the rounded ends of the spring transverse cross-sectional profile, the spring push including a spring seat for supporting the proximal end of the spring, the spring seat including spring support shelves positioned adjacent the rounded ends of the pocket transverse cross-sectional profile, the spring push defining a fiber passage having an end at the spring seat, the fiber passage having a first transverse cross-sectional profile adjacent the spring seat defining a major dimension parallel to the major dimension P1 and a minor dimension parallel to the minor dimension P2, the first transverse cross-sectional profile having central notch portions corresponding to the major dimension of the first transverse cross-sectional profile and inward projections positioned on opposite sides of the central notch portions, the spring support shelves having first shelf widths corresponding to the central notch portions and second shelf widths corresponding to the inward projections, the second shelf widths being larger than the first shelf widths; and a connector boot that mounts at the proximal end of the spring push.

2. The multi-fiber optical connector of claim 1, wherein the inward projections include convex dimples.

3. The multi-fiber optical connector of claim 2, wherein the central notch portions include concave curvatures.

4. The multi-fiber optical connector of claim 1, wherein the spring overlaps the spring support shelves at the rounded ends of the spring transverse cross-sectional profile by a distance greater than a clearance between the rounded ends of the spring transverse cross-sectional profile and inner surfaces of the latch arms at the spring support shelves.

5. The multi-fiber optical connector of claim 4, wherein the spring is formed by a coil member having a coil member thickness, and wherein the spring overlaps the spring support shelves at the rounded ends of the spring transverse cross-sectional profile by a distance greater than 0.5 times the coil member thickness.

6. The multi-fiber optical connector of claim 4, wherein the spring is formed by a coil member having a coil member thickness, and wherein the spring overlaps the spring support shelves at the rounded ends of the spring transverse cross-sectional profile by a distance greater than 0.75 times the coil member thickness.

7. The multi-fiber optical connector of claim 4, wherein the spring is formed by a coil member having a coil member thickness, and wherein the spring overlaps the spring support shelves at the rounded ends of the spring transverse cross-sectional profile by a distance greater than 1.0 times the coil member thickness.

8. The multi-fiber optical connector of claim 1, wherein the fiber passage of the spring push includes a necked portion defining the first transverse cross-sectional profile and an enlarged portion that extends from the necked portion towards the proximal end of the spring push, the enlarged portion having a second transverse cross-sectional profile having a major dimension larger than the major dimension of the first transverse cross-sectional profile.

9. The multi-fiber optical connector of claim 8, wherein the multi-fiber optical connector is connected to an optical fiber ribbon having optical fibers supported by the multi-fiber ferrule, wherein the optical fiber ribbon has a ribbon transverse cross-sectional profile defining a major dimension R1, wherein the boot defines a fiber passage having a boot transverse cross-sectional profile defining a major dimension B1 parallel to the major dimension R1, and wherein the major dimension B1 is at least 25 percent larger than the major dimension R1.

10. The multi-fiber optical connector of claim 1, wherein the multi-fiber optical connector is connected to an optical fiber ribbon having optical fibers supported by the multi-fiber ferrule, and wherein the optical fiber ribbon is de-ribbonized within the fiber optic connector at a location proximal of the multi-fiber ferrule.

11. A multi-fiber optical connector and ribbon assembly comprising:

a connector body having a distal end and a proximal end;

a multi-fiber ferrule having an end face accessible at the distal end of the connector body, the multi-fiber ferrule having a ferrule transverse cross-sectional profile having a major dimension F1 oriented perpendicular relative to a minor dimension F2, the multi-fiber ferrule defining a row of fiber openings for supporting optical fibers, the row of fiber openings extending along the major dimension F1;

a spring for biasing the multi-fiber ferrule in a distal direction relative to the connector body, the spring having a spring transverse cross-sectional profile having a major dimension S1 parallel to major dimension F1 and a minor dimension S2 parallel to the minor dimension F2, the spring transverse cross-sectional profile having rounded ends separated by the major dimension S1;

a spring push for capturing the spring and the ferrule within the connector body, the spring push having a distal end and a proximal end, the spring push including latch arms at the distal end for securing the spring push within the proximal end of the connector body, the spring push defining a spring pocket between the latch arms for receiving a proximal end of the spring, the spring pocket having a pocket transverse cross-sectional profile having a major dimension P1 parallel to the major dimension S1 and a minor dimension P2 parallel to the minor dimension S2, the pocket transverse cross-sectional profile having rounded ends separated by the major dimension P1 that receive the rounded ends of the spring transverse cross-sectional profile, the spring push including a spring seat for supporting the proximal end of the spring, the spring seat including oppositely positioned spring support shelves positioned to support the proximal end of the spring at the rounded ends of the spring transverse cross-sectional profile;

a connector boot that mounts at the proximal end of the spring push; and an optical fiber ribbon having optical fibers supported by the multi-fiber ferrule, and wherein the optical fiber ribbon is de-ribbonized within the connector body and/or the spring push at a location proximal of the multi-fiber ferrule.

12. The multi-fiber optical connector and ribbon assembly of claim 11, wherein the optical fiber ribbon includes a de-ribbonized section proximal of the multi-fiber ferrule that extends at least 10 percent of length of a multi-fiber connector of the multi-fiber optical connector and ribbon assembly.

13. A multi-fiber optical connector and ribbon assembly comprising:
- a connector body having a distal end and a proximal end;
- a multi-fiber ferrule having an end face accessible at the distal end of the connector body, the multi-fiber ferrule having a ferrule transverse cross-sectional profile having a major dimension F1 oriented perpendicular relative to a minor dimension F2, the multi-fiber ferrule defining a row of fiber openings for supporting optical fibers, the row of fiber openings extending along the major dimension F1;
- a spring for biasing the multi-fiber ferrule in a distal direction relative to the connector body, the spring having a spring transverse cross-sectional profile having a major dimension S1 parallel to major dimension F1 and a minor dimension S2 parallel to the minor dimension F2, the spring transverse cross-sectional profile having rounded ends separated by the major dimension S1;
- a spring push for capturing the spring and the ferrule within the connector body, the spring push having a distal end and a proximal end, the spring push including latch arms at the distal end for securing the spring push within the proximal end of the connector body, the spring push defining a spring pocket between the latch arms for receiving a proximal end of the spring, the spring pocket having a pocket transverse cross-sectional profile having a major dimension P1 parallel to the major dimension S1 and a minor dimension P2 parallel to the minor dimension S2, the pocket transverse cross-sectional profile having rounded ends separated by the major dimension P1 that receive the rounded ends of the spring transverse cross-sectional profile, the spring push including a spring seat for supporting the proximal end of the spring, the spring seat including oppositely positioned spring support shelves positioned to support the proximal end of the spring at the rounded ends of the spring transverse cross-sectional profile;
- a connector boot that mounts at the proximal end of the spring push; and
- an optical fiber ribbon having optical fibers supported by the multi-fiber ferrule, wherein the optical fiber ribbon has a ribbon transverse cross-sectional profile defining a major dimension R1, wherein the boot defines a fiber passage having a boot transverse cross-sectional profile defining a major dimension B1 parallel to the major dimension R1, and wherein the major dimension B1 is at least 25 percent larger than the major dimension R1.

* * * * *